Patented Dec. 4, 1934

1,982,619

UNITED STATES PATENT OFFICE 1,982,619

MANUFACTURE OF WATER SOLUBLE CONDENSATION PRODUCTS OF PHENOL-UREA-FORMALDEHYDE

Fritz Becherer, Riehen, near Basel, Switzerland, assignor to the firm J. R. Geigy S. A., Basel, Switzerland No Drawing. Application March 3, 1932, Serial No. 596,676. In Germany March 16, 1931

5 Claims. (Cl. 260—4)

Many processes have been suggested for the purpose of rendering resins soluble. For instance sulphonic acids of phenols or naphthols have been treated with formaldehyde or another aliphatic aldehyde under mild conditions, that is to say in an aqueous medium and with avoidance of high temperatures. A similar effect has been attained by treating insoluble resins with sulphites and formaldehyde. Further the British specification No. 182,823 discloses the direct sulphonation of phenolformaldehyde resins obtained by alkaline condensation.

Such processes, however, do not serve for the conversion into a form soluble in water of such condensation products as are obtained, with use of strong acids or acid salts as accelerators, from mixtures of phenols and formaldehyde and which are in a solid state. When such resins are treated with sulphonating agents under known sulphonating conditions, a spontaneous reaction very soon sets in with development of a strong red colour; there are produced foam-like, insoluble and infusible masses.

According to the present invention phenol-urea-formaldehyde resins are obtained in a form soluble in water by treating said resins, alone or in mixture with natural resins, with a phenol, or a homologue or substitution product thereof, and then treating the homogeneous liquid thus obtained with a sulphonating agent, preferably at a raised temperature, until solubility in water has been attained. Such products are scarcely coloured and are applicable as tanning agents, mordants or the like in the leather and textile industries. They are especially precious as wool reserving agents in the mixed wool dyeing and are also advantageously distinguished in this respect from the final products obtained according to British specification No. 182,823.

The following examples illustrate the invention, the parts being by weight:—

Example 1

80 parts of a resin made by condensing at 85° C. 100 parts of phenol with 20 parts of urea and 120 parts of formaldehyde solution of 38 per cent. strength by means of 2.5 parts of sulphuric acid of 40 per cent. strength are stirred with 100 parts of phenol at 70° C. until a homogeneous solution of the resin is produced. Into this solution at a temperature between 40° C. and 110° C., 100 parts of sulphuric acid of 66° Bé. are allowed to flow and stirring is continued until a sample is soluble in its own volume of water, even in the cold, to a clear solution.

After neutralizing the excess of acid by means of sodium carbonate, the soluble resin can be salted out by means of common salt or may be separated by evaporation. It then forms a feebly coloured amorphous mass, solutions of which have a high capacity for precipitating basic dyestuffs.

Example 2

55 parts of phenol and 20 parts of colophony are fused together and the mass is stirred with 125 parts of formaldehyde solution of about 37 per cent. strength and 35 parts of area until a uniform emulsion is obtained. At 40° C. 2 parts of concentrated hydrochloric acid are added and the mixture is heated, after the spontaneously produced reaction has abated, in an open vessel at 85–90° C. until the main portion of the water has evaporated. The precipitated resin is pale yellow and brittle when cold.

For the sulphonation the resin is introduced into 120 parts of phenol and treated with 125 parts of concentrated sulphuric acid until the desired solubility has been attained. The alkali salt of the sulphonic acid thus obtained dissolves in all proportions in water; in concentrated solutions mineral acids produce a cheesy precipitate.

Example 3

75 parts of phenol and 68.3 parts of biuret are together condensed with 125 parts of formaldehyde solution of 37.5 per cent. strength by weight in the presence of 2 per cent. of sulphuric acid of 40 per cent. strength by weight, calculated on the quantity of phenol, the operation continuing for 3 hours at 55° C. and for 2½ hours at 85° C. The product, which has separated in the form of a precipitate, is of the consistency of tough dough when warm and when cold it is hard and brittle and of milky turbidity.

For the further working up of the product 90 parts of the resin are introduced gradually into 70 parts of phenol at 75° C. and each dose is so mixed with the mass that no clots form which later would not dissolve. As soon as a uniform syrup has been produced it is cooled to 40° C. and, while strongly stirring, 85 parts of concentrated sulphuric acid are allowed to run in. After 12 hours at 90–100° C. the reaction is at an end. By addition of water the solution is made up to about 65 per cent. strength and, after cooling, the reaction product which has separated is removed from the aqueous sulphuric acid. After suitable further dilution with water and neutralization with caustic soda lye, there is obtained by evaporation in a vacuum a reddish mass of conchoidal fracture, solutions of which have the characteristics of tanning agents and mordants.

Example 4

75 parts of the condensation product described in Example 1 are dissolved at 70° C. in 60 parts of phenol; then at the same temperature there is added a sulphonic acid mixture, made by sulphonating for 15 hours 33 parts of tetraline and 32 parts of naphthalene by means of 70 parts of concentrated sulphuric acid at 100–120° C. After some hours the mass has become soluble, even in a small proportion of water. The solution is neutralized with ammonia and evaporated in a vacuum to obtain the ammonium salt in solid form. By addition of a solution of glue to an acidified solution of the product there is obtained a thick white precipitate.

Example 5

100 parts of phenol are melted and there are added thereto 49 parts of urea in a mixture of 20 parts of water and 2 parts of sulphuric acid of 40 per cent. strength. There is then introduced, while stirring well, 150 parts of formaldehyde solution of 37.5 per cent. strength, and the whole is heated until the mass can be powdered when cold.

The comminuted resin is now dissolved in 150 parts of crude cresol (the commercial mixture of the 3 isomeric cresols). The solution is sulphonated by cautious addition of 180 parts of concentrated sulphuric acid and gradually increasing the temperature from 40° C. to 105° C. After dilution with water and neutralization with sodium carbonate there is obtained by evaporation a product having a high capacity for precipitating glue.

In all the above examples, it is also possible to add to the artificial formaldehyde-resin any natural resin, such as pine resin, before its hot after-treatment with phenol or crude cresol. Instead of phenol, its substitution products, such as chloro- or bromophenol, may be used. Also pure cresol and its substitution products, such as bromocresol, are usable.

What I claim is:—

1. A process for the manufacture of water soluble condensation products from insoluble phenol-formaldehyde-urea resins, serving as tanning agents, wool reserving agents, mordants or the like, consisting in heating said insoluble phenol-formaldehyde-urea resins with a phenol so as to dissolve them therein, with a concomitant partial condensation thereof with said phenol, and subjecting then the liquid thus obtained to the action of a sulphonating agent.

2. A process for the manufacture of water soluble condensation products from insoluble phenol-formaldehyde-urea resins, serving as tanning agents, wool reserving agents, mordants or the like, consisting in heating said phenol-formaldehyde-urea resins with crude cresol so as to dissolve them therein, with a concomitant partial condensation thereof with said cresol, and subjecting then the liquid thus obtained to the action of a sulphonating agent.

3. A process for the manufacture of water soluble condensation products from insoluble phenol-formaldehyde-urea resins, serving as tanning agents, wool reserving agents, mordants or the like, consisting in treating said phenol-formaldehyde-urea resins at a temperature between 70° and 90° C. with a phenol so as to dissolve them therein, with a concomitant partial condensation thereof with said phenol, and subjecting then the liquid thus obtained to the action of a sulphonating agent.

4. A process for the manufacture of water soluble condensation products from insoluble phenol-formaldehyde-urea resins, serving as tanning agents, wool reserving agents, mordants or the like, consisting in heating said phenol-formaldehyde-urea resins at a temperature between 70° and 90° C. with a phenol so as to dissolve them therein, with a concomitant partial condensation thereof with said phenol, and subjecting then the liquid thus obtained to the action of concentrated sulphuric acid.

5. Water soluble condensation products from the interaction of an insoluble phenol-formaldehyde-urea resin, a phenol and a sulphonating agent, said products scarcely colored being soluble in water and serving as tanning agents, wool reserving agents, mordants or the like in the leather and textile industries.

FRITZ BECHERER.